(12) United States Patent
Yamamichi et al.

(10) Patent No.: US 7,155,610 B2
(45) Date of Patent: Dec. 26, 2006

(54) CRYPTOCOMMUNICATION SYSTEM, TRANSMISSION APPARATUS, AND RECEPTION APPARATUS

(75) Inventors: Masato Yamamichi, Kadoma (JP); Yuichi Futa, Osaka (JP); Motoji Ohmori, Hirakata (JP); Makoto Tatebayashi, Takarazuka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 720 days.

(21) Appl. No.: 10/020,308

(22) Filed: Dec. 18, 2001

(65) Prior Publication Data

US 2002/0116612 A1 Aug. 22, 2002

(30) Foreign Application Priority Data

Dec. 19, 2000 (JP) ............................. 2000-384835

(51) Int. Cl.
*H04L 9/00* (2006.01)
(52) U.S. Cl. ...................... 713/181; 713/168; 713/176; 713/150; 380/255
(58) Field of Classification Search ................ 713/181, 713/168, 176
See application file for complete search history.

(56) References Cited

U.S. PATENT DOCUMENTS

| | | | | |
|---|---|---|---|---|
| 5,412,730 A | * | 5/1995 | Jones | 380/46 |
| 5,568,554 A | * | 10/1996 | Eastlake, 3rd | 713/181 |
| 6,081,598 A | * | 6/2000 | Dai | 380/28 |
| 6,523,115 B1 | * | 2/2003 | Ono et al. | 713/181 |
| 6,963,971 B1 | * | 11/2005 | Bush et al. | 713/153 |

FOREIGN PATENT DOCUMENTS

| | | |
|---|---|---|
| JP | 2000-216773 | 8/2000 |
| JP | 2000-516733 | 12/2000 |

OTHER PUBLICATIONS

Jeffrey Hoffstein et al., "Implementation Notes for NTRU PKCS Multiple Transmissions", May 26, 1998, Report #6, Version 1, NTRU Cryptosystems Technical Report.

* cited by examiner

*Primary Examiner*—Kambiz Zand
*Assistant Examiner*—Samson Lemma
(74) *Attorney, Agent, or Firm*—Wenderoth, Lind & Ponack, L.L.P.

(57) ABSTRACT

A transmission apparatus performs a one-way operation on plaintext to generate a first value and transmits the first value, generates first additional information, performs an invertible operation on the plaintext and first additional information to generate connected information, encrypts the connected information using an encryption algorithm to generate ciphertext, and transmits the ciphertext. A reception apparatus receives the first value and the ciphertext, generates second additional information identical to the first additional information, decrypts the ciphertext using a decryption algorithm, which is an inverse-conversion of the encryption algorithm, to generate decrypted connected information, decrypts the decrypted connected information and the second additional information according to an inverse of the invertible operation to generate decrypted text, performs the one-way operation on the decrypted text to generate a second value, compares the first and second values, and judges that the decrypted text is valid only when the first and second values match.

14 Claims, 14 Drawing Sheets

CRYPTOCOMMUNICATION SYSTEM

Fig.7

CONVERSION TABLE

| INPUT VALUE m | OUTPUT VALUE Tab[Ra](m) |
|---|---|
| 0 | 122 |
| 1 | 39 |
| ••••• | ••••• |
| 255 | 91 |

Fig.14

| ADDITIONAL INFORMATION / INVERTIBLE CONVERSION F(m,Ra) | (1)Ra: RANDOM NUMBER | (2)Ra: TIME STAMP | (3)Ra: COUNTER |
|---|---|---|---|
| (1) m‖Ra | CRYPTOCOMMUNICATION SYSTEM 1, 1b~1d | | |
| (2) m⊕Ra | CRYPTOCOMMUNICATION SYSTEM 1b~1d | | |
| (3) m+Ra | | | |
| (4) m×Ra mod p | | | |
| (5) BitPerm[Ra](m) | | | |
| (6) Tab[Ra](m) | | | |

CRYPTOCOMMUNICATION SYSTEM, TRANSMISSION APPARATUS, AND RECEPTION APPARATUS

This application is based on an application No. 2000-384835 filed in Japan, the content of which is hereby incorporated by reference.

BACKGROUND OF THE INVENTION (1) Field of the Invention

The present invention relates to an encryption technology used as an information security technology, and especially to a technology for detecting errors that occur in decrypting.

(2) Description of the Related Art

As data communication using a computer technology or a communication technology becomes widespread, cryptocommunication systems are becoming prevalent. Cryptocommunication enables data communication without revealing the communications to a third party who is not an intended party.

Cryptosystems are used for realizing the cryptocommunication systems. In cryptosystems, an authentic encryption key is used in applying an encryption algorithm to plaintext for generating ciphertext, and an authentic decryption key is used in applying a decryption algorithm to the ciphertext for generating decrypted text. In some cryptosystems, there is a possibility of generating decrypted text which is different from original plaintext. Hereinafter, the phenomena in which generated decrypted text is different from its original plaintext is referred to as a "decryption error," and the cryptosystem in which this decryption error occurs is referred to as a "decryption error vulnerable cryptosystem."

One example of the above-mentioned decryption error vulnerable cryptosystems is a NTRU cryptosystem. The NTRU cryptosystem, simply put, generates ciphertext by encrypting plaintext by using random numbers as parameters and an encryption key, and generates decrypted text by decrypting the ciphertext by using a decryption key. This cryptosystem, which uses random numbers as parameters, has a chance of obtaining different ciphertext from the same plaintext.

For a detailed description of the NTRU cryptosystem, please refer to Jeffrey Hoffstein, Jill Pipher, and Joseph H. Silverman, "NTRU: Aringbasedpublic key cryptosystem," Lecture Notes in Computer Science, 1423, pp. 267–288, Springer-Verlag, 1998.

In the cryptocommunication system using the NTRU cryptosystem, there is a possibility of obtaining different decrypted text from the original plaintext. Therefore, intended information is not insured to be transmitted to the receivers.

FIRST CONVENTIONAL EXAMPLE

In order to overcome the above stated problem, the following cryptocommunication system using the NTRU cryptosystem has been proposed. This cryptocommunication system consists of an encrypting apparatus and a decrypting apparatus. The encrypting apparatus and the decrypting apparatus are connected to each other through a communication channel.

The encrypting apparatus generates n random numbers $r_1$, $r_2$, ..., $r_n$, and encrypts plaintext m by using an encryption key Kp stored in advance and the mentioned random numbers as parameters, in order to obtain n pieces of ciphertext $c_1$, $c_2$, ..., $c_n$.

$$c_1 = E(m, Kp, r_1)$$

$$c_2 = E(m, Kp, r_2)$$

...

$$c_n = E(m, Kp, r_n)$$

Here, the equation C=E (M, K, R) shows that the ciphertext C is generated by encrypting the plaintext M by using the encryption key K and the random number R as parameters.

Next, the encrypting apparatus transmits, to the decrypting apparatus, the generated n pieces of ciphertext $c_1$, $c_2$, ..., $c_n$ through the communication channel.

The decrypting apparatus receives, through the communication channel, the n pieces of ciphertext $c_1$, $c_2$, ..., $C_n$, and decrypts the received ciphertext $c_1$, $c_2$, ..., $C_n$, by using the decryption key Ks stored in advance, in order to obtain decrypted text $m'_1$, $m'_2$, ..., $m'_n$.

$$m'_1 = D(c_1, Ks)$$

$$m'_2 = D(c_2, Ks)$$

...

$$m'_n = D(c_n, Ks)$$

Next, the decrypting apparatus considers that a decryption error has occurred if a single component in the decrypted text $m'_1$, $m'_2$, ..., $m'_n$ is different from its corresponding original plaintext.

This cryptocommunication system is inefficient in that the system increases communications, even if the system is capable of detecting the occurrence of decryption errors. In addition, there is a possibility of degrading the security for this cryptocommunication system, in which different random numbers are used as parameters for transmitting a plurality of pieces of ciphertext based on the same plaintext.

This is due to the possibility that, from n equations, $$c_1 = E(m, Kp, r_1)$$

$$c_2 = E(m, Kp, r_2)$$

...

$$c_n = E(m, Kp, r_n),$$

the information on the plaintext m or on the random numbers r[1], r[2], ..., r[n] are likely to be revealed to third parties. The encryption attack using this inherent disadvantage in the NTRU system is called "multiple transmission attack."

Specifically, it is known that the security is endangered when the decryption error detection is performed in the NTRU cryptosystem which is one of the detection error vulnerable cryptosystems. Please refer, for a detailed description about the multiple transmission attack, to Jeffrey Hoffstein, Jill Pipher, and Joseph H. Silverman, "NTRU: A ring based public key cryptosystem," Lecture Notes in Computer Science, 1423, pp. 267–288, Springer-Verlag, 1998.

As described above, the decryption error detection performed in the NTRU cryptosystem has a problem of increasing communications and lowering the security level.

SECOND CONVENTIONAL EXAMPLE

A Japanese Laid-Open Publication No. 2000-216773 discloses the following technology for the purpose of providing a method and an apparatus for judging the correctness of the encrypted information in which receivers of the encrypted information can judge whether or not the decrypted information is correct.

In this technology, a sender calculates a first hash value of plaintext by using a predetermined hash value generation algorithm, and sends the first hash value with ciphertext resulting from encrypting the plaintext by using an encryption algorithm. Then, a receiver receives the ciphertext with the first hash value, generates decrypted text by decrypting the ciphertext, calculates a second hash value of the decrypted text by using the same hash value generation algorithm that was used for calculating the first hash value, compares the first hash value and the second hash value, and judges that the decrypted text is correct only when the first and the second hash values match.

However, even when the above-mentioned conventional technologies are used, it is difficult to completely avoid third parties' attacks. A more secured cryptocommunication system is therefore desired.

SUMMARY OF THE INVENTION

The object of the present invention, in order to solve the above problem, is to provide a cryptocommunication system, a transmission apparatus, a reception apparatus, a method of cryptocommunication, a program for a cryptocommunication, and a recording medium on which the program is recorded, that are more secure.

The object of the present invention is achieved by a cryptocommunication system including a transmission apparatus and a reception apparatus. The transmission apparatus encrypts plaintext to generate ciphertext, performs a one-way operation on the plaintext to generate a first value, and transmits the ciphertext and the first value to the reception apparatus. The reception apparatus receives the ciphertext and the first value, decrypts the ciphertext to generate decrypted text, performs the one-way operation on the decrypted text to generate a second value, and judges that the decrypted text matches the plaintext when the second value and the first value match. The transmission apparatus includes: a first generating unit for generating first additional information; a first operation unit for performing an invertible operation on the plaintext and the first additional information to generate connected information; an encrypting unit for encrypting the connected information according to an encryption algorithm so as to generate the ciphertext; and a transmitting unit for transmitting the ciphertext. The reception apparatus comprises: a receiving unit for receiving the ciphertext; a second generating unit for generating second additional information which is identical to the first additional information; a decrypting unit for decrypting the ciphertext according to a decryption algorithm, which is an inverse-conversion of the encryption algorithm, so as to generate decrypted connected information; and a second operation unit for performing an inverse operation of the invertible operation on the decrypted connected information and the second additional information so as to generate the decrypted text.

According to this structure, the transmission apparatus enables connected information to be generated by performing an invertible operation on the plaintext and on the first additional information, encrypted connected information to be generated by encrypting the connected information, and the encrypted connected information to be transmitted. The reception apparatus enables the connected information to be received, decrypted connected information to be generated by decrypting the received encrypted connected information, and decrypted text to be generated by performing an inverse operation of the invertible operation on the decrypted connected information and on the second additional information. This realizes a more secure cryptocommunication system than the conventional systems.

Here, in the cryptocommunication system of the present invention, the second generating unit synchronizes with the first generation unit so as to generate the second additional information which is identical to the first additional information.

According to this structure, the second generating unit synchronizes with the first generating unit in order to generate second additional information which is identical to the first additional information, thereby enabling decrypted connected information to be obtained which has the same content as the connected information.

Here, in the cryptocommunication system of the present invention, the first generating unit generates a random number, and sets the generated random number as the first additional information.

According to this structure, the first generating unit can generate first additional information by using a random number, thereby generating different additional information for each communication. This makes it difficult to infer first additional information from encrypted connected information. Here, in the cryptocommunication system of the present invention, the invertible operation unit bit-connects the plaintext with the first additional information so as to generate the connected information, and the second operation unit deletes the second additional information from the decrypted connected information so as to generate the decrypted text.

According to this structure, the invertible operation unit can generate connected information by bit-connecting the plaintext with the first additional information, and the inverse invertible operation unit can generate decrypted text by deleting the second additional information from the decrypted connected information. Therefore, correct decrypted text is assured to be obtained from the decrypted connected information.

BRIEF DESCRIPTION OF THE DRAWINGS

These and other objects, advantages and features of the present invention will become more apparent from the following detailed description when taken in conjunction with the accompanying drawings that illustrate a specific embodiment of the invention. In the drawings:

FIG. 7 is an example of the conversion table used in the calculation method 6;

FIG. 14 is a table showing possible combinations between the modifications.

DETAILED DESCRIPTION OF THE PREFERRED EMBODIMENTS

1. Cryptocommunication System 1

The following is a description of a cryptocommunication system 1 which is one embodiment pertaining to the present invention.

1.1 The Structure of the Cryptocommunication System 1

Figure 1:
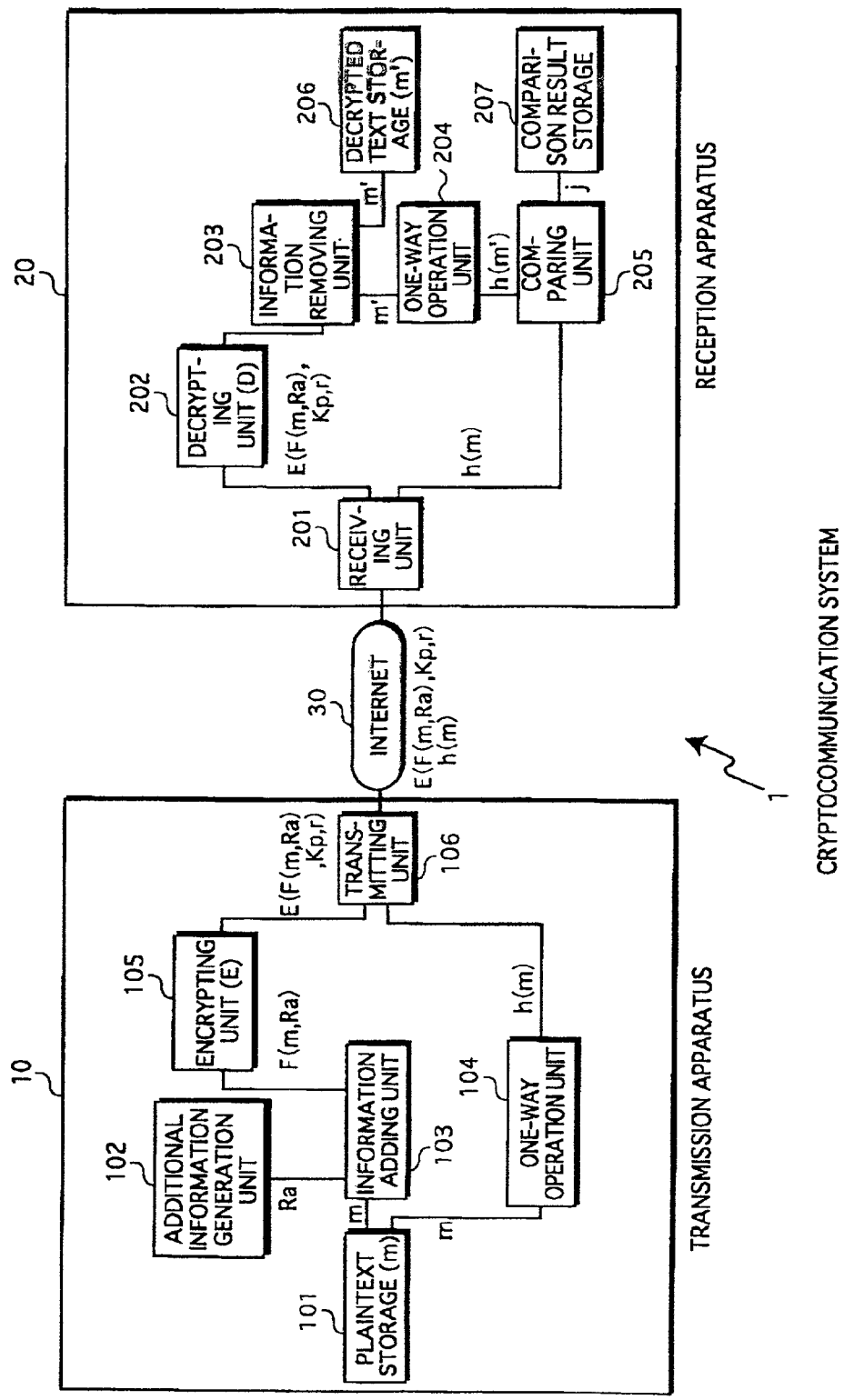
FIG. 1 is a block diagram showing a structure of a cryptocommunication system 1.

A cryptocommunication system 1 is a system in which decryption error detection is enabled for the decryption error vulnerable cryptocommunication systems. As shown in FIG. 1, the cryptocommunication system 1 consists of a transmission apparatus 10 and a reception apparatus 20, both of which are connected to each other through an internet 30.

The cryptocommunication system 1 uses the NTRU cryptosystem which is one of the decryption error vulnerable cryptosystems. Please refer to Jeffrey Hoffstein, Jill Pipher, and Joseph H. Silverman, "NTRU: A ring based public key cryptosystem," Lecture Notes in Computer Science, 1423, pp. 267–288, Springer-Verlag, 1998 for a detailed description about a method of generating NTRU ciphertext, and a method of generating an encryption key and a decryption key for the NTRU cryptosystem.

The transmission apparatus 10 generates ciphertext by applying, to the plaintext stored in advance, the encryption algorithm according to the NTRU cryptosystem, and transmits the generated ciphertext to the reception apparatus 20. The reception apparatus 20, in turn, receives the ciphertext, and generates decrypted text by applying, to the received ciphertext, the decryption algorithm according to the NTRU cryptosystem.

1.2 The Structure of the Transmission Apparatus 10

The transmission apparatus 10 consists of a plaintext storage 101, an additional information generation unit 102, an information adding unit 103, a one-way operation unit 104, an encrypting unit 105, and a transmitting unit 106. The transmission apparatus 10 is concretely a computer system composed of a microprocessor, ROM, RAM, a hard disk unit, a display unit, a key board, a mouse, a communication unit, and the like. The RAM or the hard disk unit stores a computer program. The transmission apparatus 10 realizes its function by making the microprocessor work according to the computer program.

(1) The Plaintext Storage 101

The plaintext storage 101 stores plaintext m in advance. The plaintext m is composed of information with a fixed length.

(2) The Additional Information Generation Unit 102

The additional information generation unit 102 generates additional information Ra which is a random number with a predetermined bit length of rLen, and outputs the generated additional information Ra to the information adding unit 103.

(3) The Information Adding Unit 103

The information adding unit 103 reads out the plaintext m from the plaintext storage 101, and receives the additional information Ra from the additional information generation unit 102.

Next, the information adding unit 103 connects the read plaintext m with the received additional information Ra by a bit-connecting method, so as to obtain resulting connected information F (m, Ra)=m∥Ra.

Here, the operator "∥" signifies a bit-connecting. The bit-connecting represents a single value which is a result from uniting two values, each being represented as a bit row. In an example assuming that m=10, rLen=5, and Ra=7, the bit row representation for the plaintext m is "1010", and the bit row representation for the additional information Ra with a length of rLen is "00111". Thus, the result from the bit-connecting is "101000111," which means 327 in decimal notation.

Next, the information adding unit 103 outputs the generated connected information F(m, Ra) to the encrypting unit 105.

(4) The One-Way Operation Unit 104

The one-way operation unit 104 stores a hash function h which is a one-way operation.

Here, the one-way operation is a function which is designed to calculate a value from an inputted value, and which makes it difficult to calculate the originally inputted value from the value. Further, an assumption is made about the hash function h used here that it is assured to be difficult enough to obtain a value for the plaintext m by using the value h(m), and it is collide-free. For the details of the one-way operation, the hash function, the security of the hash function, and the collision-free characteristic of the hash function, refer to Tatsuaki Okamoto, Hirosi Yamamoto, "Gendai Ango" (Modern cryptography), Series/Mathematics in Information Science, Sangyo-Tosho, 1997,pp. 56, and pp. 189–195.

The one-way operation unit 104 reads out the plaintext m from the plaintext storage 101, calculates a value h(m) from the read plaintext m by using the hash function h, and outputs the calculated value h(m) to the transmitting unit 106.

(5) The Encrypting Unit 105

Figure 2:
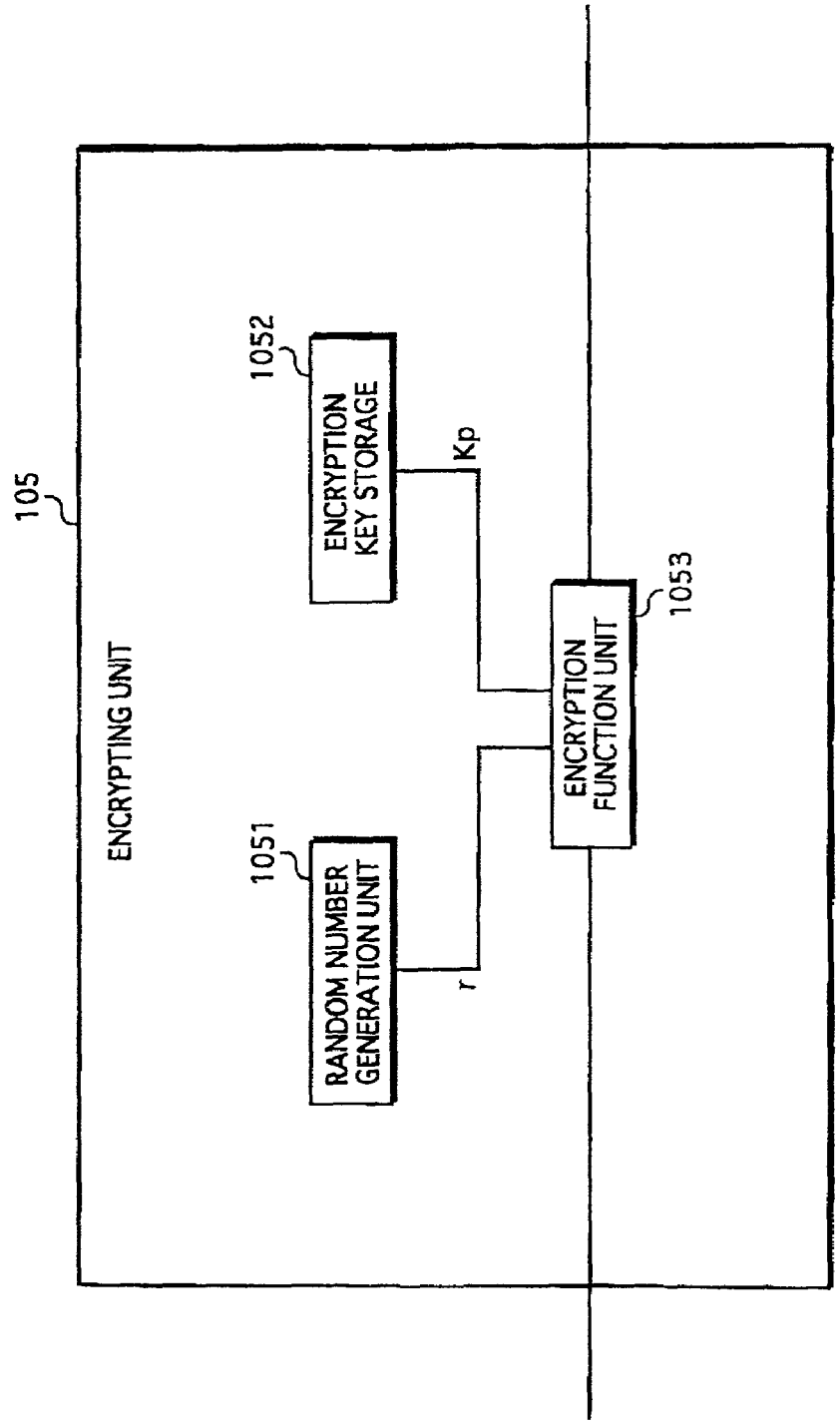
FIG. 2 is a block diagram showing a structure of an encrypting unit 105.

As shown in FIG. 2, the encrypting unit 105 consists of a random number generation unit 1051, an encryption key storage 1052, and an encryption function unit 1053.

a. The Encryption Key Storage Unit 1052

The encryption key storage unit 1052 stores an encryption key Kp in advance.

b. The Random Number Generation Unit 1051

The random number generation unit 1051 generates a random number r, using a rand ( ) which is a library function for the C language, for example, and outputs the generated random number r to the encryption function unit 1053.

c. The Encryption Function Unit 1053

The encryption function unit 1053 includes an encryption algorithm dedicated to the NTRU encryption cryptosystem in advance.

The encryption function unit 1053 receives a connected information F (m, Ra) from the information adding unit 103, receives a random number r from the random number generation unit 1051, and reads out an encryption key Kp from the encryption key storage 1052.

Next, the encryption function unit 1053, by using the random number r and the read encryption key Kp, encrypts the received connected information F(m,Ra) according to the encryption algorithm, so as to generate encrypted connected information E (F(m, Ra), Kp, r), and outputs the generated encrypted connected information E(F(m, Ra), Kp, r) to the transmitting unit 106.

(6) The Transmitting Unit 106

The transmitting unit 106 receives the encrypted connected information E (F(m, Ra), Kp, r) and the value h(m), and transmits the received encrypted connected information E (F(m, Ra), Kp, r) and value h(m) to the reception apparatus 20 through the internet 30.

1.3 The Structure of the Reception Apparatus 20

The reception apparatus 20 consists of a receiving unit 201, a decrypting unit 202, an information removing unit 203, a one-way operation unit 204, a comparison (comparing) unit 205, a decrypted text storage 206, and a comparison result storage 207. The reception apparatus 20 is specifically the same computer system as the transmission apparatus 10.

(1) The Receiving Unit 201

The receiving unit 201 receives, from the transmission apparatus 10, the encrypted connected information E (F(m, Ra), Kp, r) and the value h(m) through the internet 30, and outputs the received encrypted connected information E to the decrypting unit 202, and outputs the received value h (m) to the comparison unit 205.

(2) The Decrypting Unit 202

Figure 3:
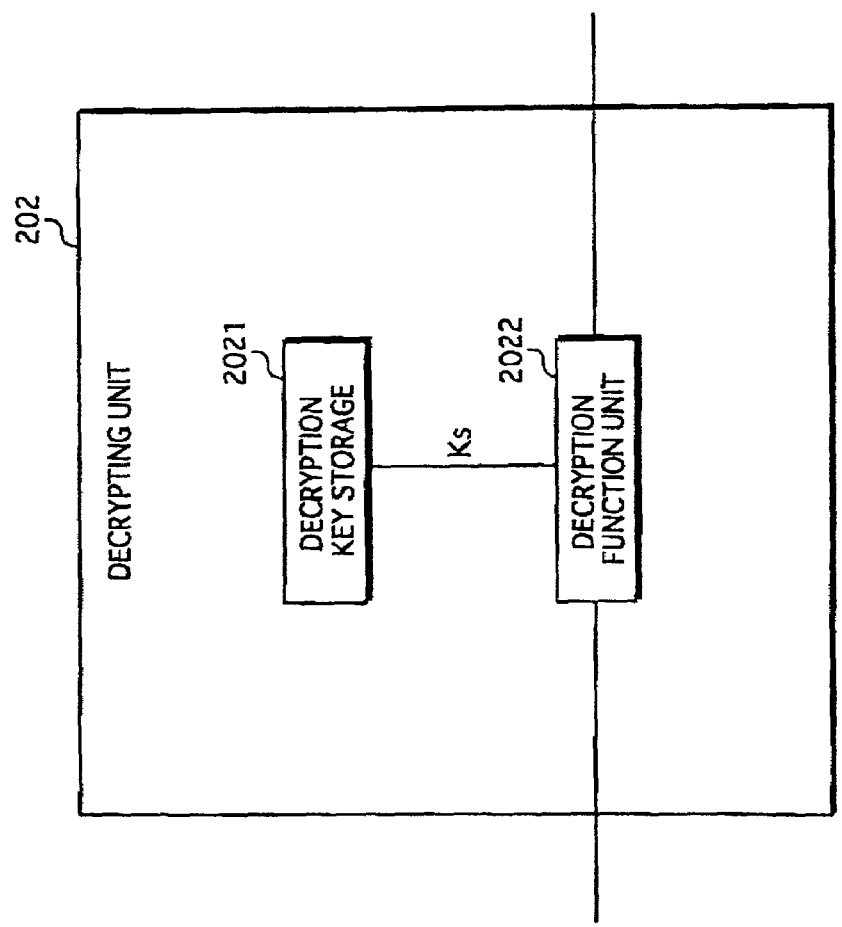
FIG. 3 is a block diagram showing a structure of a decrypting unit 202.

As shown in FIG. 3, the decrypting unit 202 consists of a decryption key storage 2021 and a decryption function unit 2022.

a. The Decryption Key Storage 2021

The decryption key storage unit 2021 stores a decryption key Ks in advance.

b. The Decryption Function Unit 2022

The decryption function unit 2022 stores a decryption algorithm which is an inversed form of the encryption algorithm which is included in the encryption function unit 1053.

The decryption function unit 2022 receives the encrypted connected information E(F(m, Ra), Kp, r) from the receiving unit 201, and reads out the decryption key Ks from the decryption key storage 2021.

Next, the decryption function unit 2022, by using the read decryption key Ks, decrypts the received encrypted connected information E(F(m,Ra),Kp,r) according to the decryption algorithm, so as to generate a decrypted connected information D (E(F(m, Ra), Kp, r), Ks), and outputs the decrypted connected information to the information removing unit 203.

(3) The Information Removing Unit 203

The information removing unit 203 stores a bit length rLen in advance.

The information removing unit 203 receives the decrypted connected information D(E(F(m, Ra), Kp, r), Ks) from the decrypting unit 202, removes the additional information Ra from the decrypted connected information, by removing a bit row of the rLen bit length from the end of the received decrypted connected information D(E(F(m, Ra), Kp, r), Ks), generates decrypted text from the remaining information after the additional information Ra is removed from the decrypted connected information, and outputs the generated decrypted text m' to the one-way operation unit 204. The information removing unit 203 also writes the generated decrypted text m' on the decrypted text storage 206.

(4) The One-Way Operation Unit 204

The one-way operation unit 204 stores, in advance, the same hash function h which is included in the one-way operation unit 104.

The one-way operation unit 204 receives the decrypted text m' from the information removing unit 203, hashes the received decrypted text m' according to the hash function h so as to generate a functional value h(m'), and outputs the value h(m') to the comparison unit 205.

(5) The Comparison Unit 205

The comparison unit 205 receives the value h(m) from the receiving unit 201, and the value h(m') from the one-way operation unit 204.

Next, the comparison unit 205 compares the value h(m) with the value h(m'), judges whether the two values match, and generates a comparison result j which shows whether these values match or do not match. Specifically, the comparison unit 205, when these values match, generates a comparison result which shows j=1, and when these values do not match, generates a comparison result which shows j=0. The comparison unit 205 writes the generated comparison result j on the comparison result storage 207.

(6) The Decrypted Text Storage 206

The decrypted text storage 206 has an area for storing decrypted text.

(7) The Comparison Result Storage 207

The comparison result storage 207 has an area for storing the comparison result j.

1.4 The Action of the Transmission Apparatus 10

Figure 4:
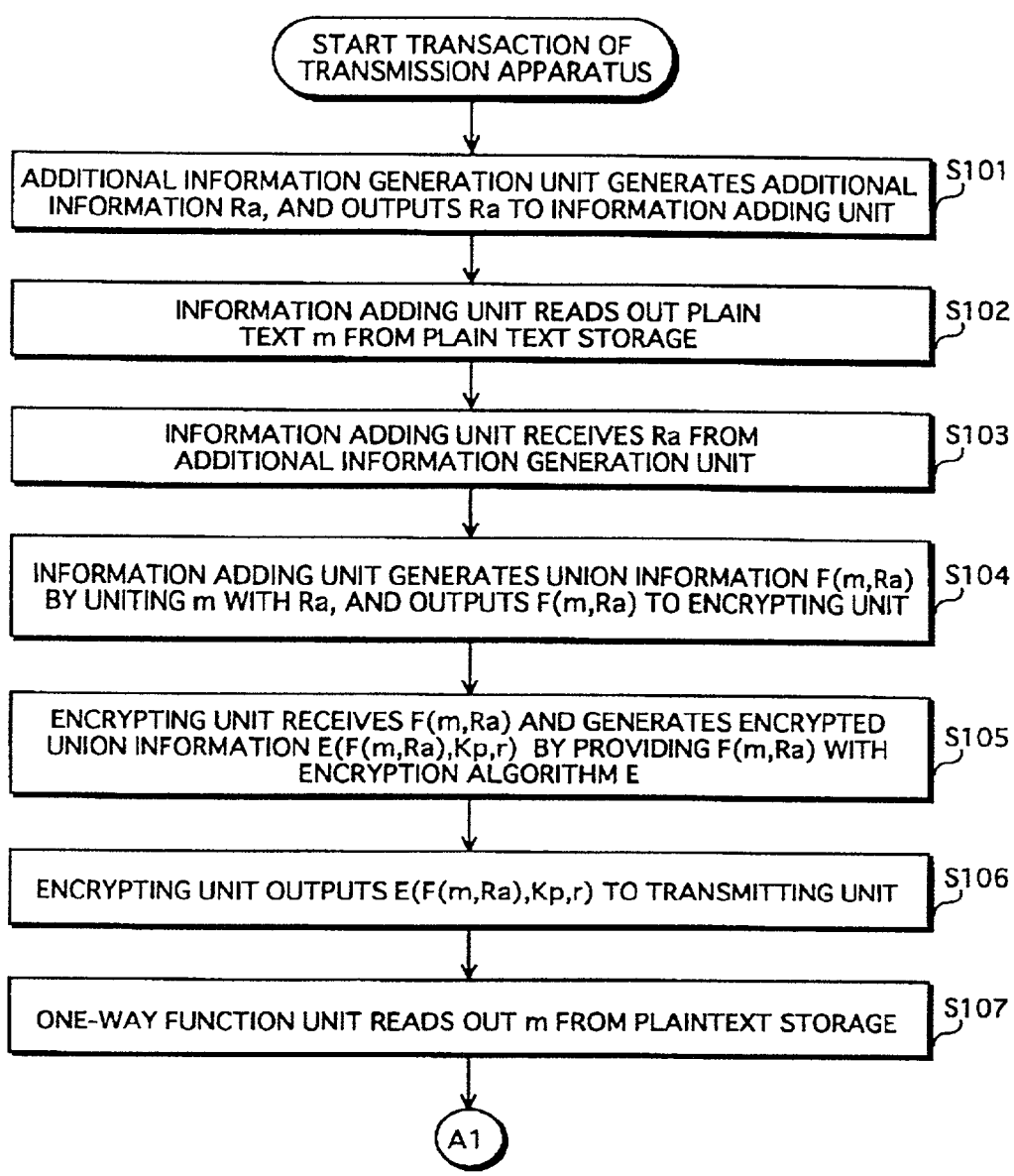
FIG. 4 is a flowchart showing an action performed by a transmission apparatus 10, where the continuation thereof is shown in FIG. 5.
Figure 5:
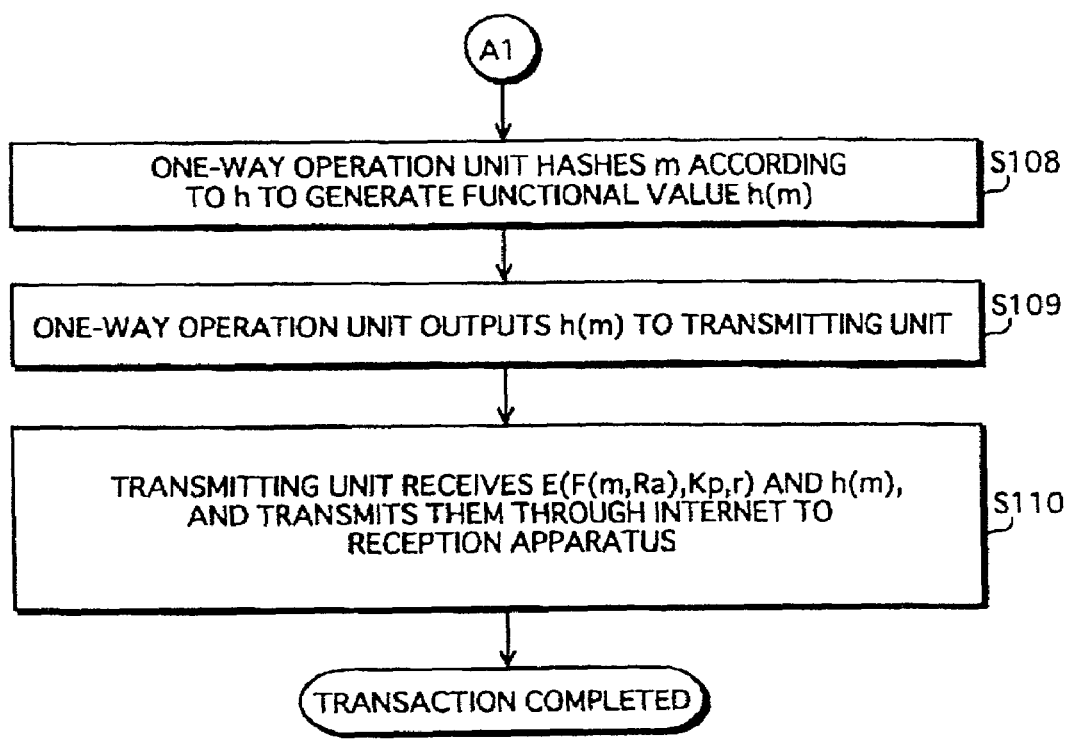
FIG. 5 is a flowchart showing an action performed by the transmission apparatus 10, which is a continuation from FIG. 4.

The following is a description of the action (operation) that the transmission apparatus 10 performs, with reference to the flowcharts shown in FIG. 4 and FIG. 5.

The additional information generation unit 102 generates additional information Ra, and outputs the generated additional information Ra to the information adding unit 103 (Step S101).

Next, the information adding unit 103 reads out the plaintext m from the plaintext storage 101 (step S102), receives the additional information Ra from the additional information generation unit 102 (step S103), generates connected information F(m, Ra) by uniting the plaintext m with the additional information Ra, and outputs the generated connected information F(m, Ra) to the encrypting unit 105 (step S104).

Next, the encrypting unit 105 receives the connected information F(m, Ra), generates encrypted connected information E(F(m, Ra), Kp, r) by applying the encrypting algorithm E to the received connected information F(m, Ra)(step S105), and outputs the generated encrypted connected information E(F(m,Ra), Kp, r) to the transmitting unit 106 (step S106).

Next, the one-way operation unit 104 reads out the plaintext m from the plaintext storage 101 (step S107), calculates a value h (m) from the plaintext m by using the hash function h (step S108), and outputs the calculated value h(m) to the transmitting unit 106 (step S109).

The transmitting unit 106 receives the encrypted connected information E(F(m,Ra), Kp, r) and the value h(m), and transmits, through the internet 30, the received encrypted connected information and the value h(m) to the reception apparatus (step S110).

1.5 The Action that the Reception Apparatus 20 Performs

Figure 6:
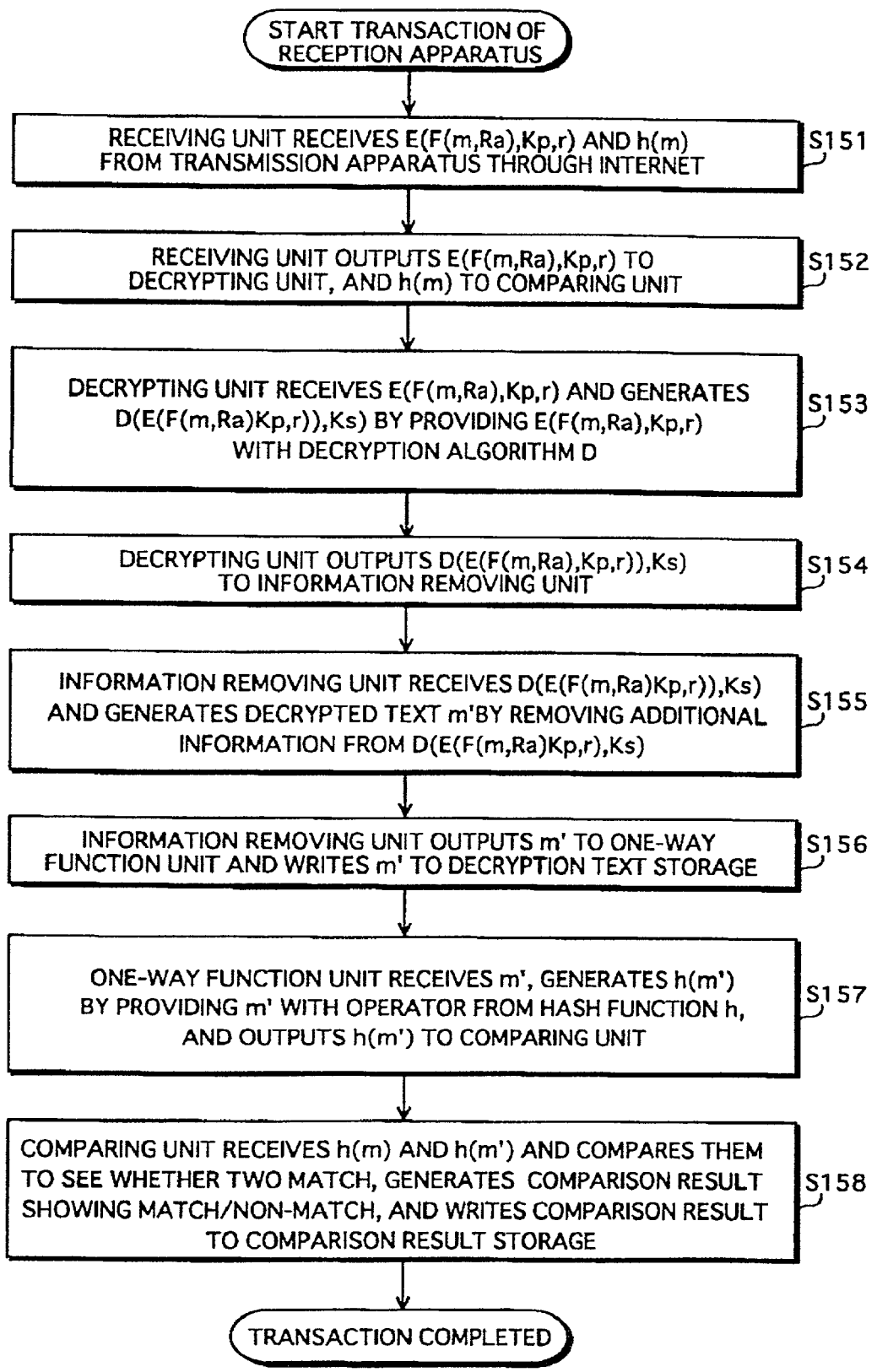
FIG. 6 is a flowchart showing an action performed by a reception apparatus 20.

The following is a description of the action that the reception apparatus 20 performs, with reference to the flow-chart shown in FIG. 6.

The receiving unit 201 receives, from the transmission apparatus 10, the encrypted connected information E(F(m, Ra), Kp,r) and the value h(m) through the internet 30 (step S151), outputs the received encrypted connected information to the decrypting unit 202, and outputs the received value h(m) to the comparison unit 205 (step S152).

The decrypting unit 202 receives the encrypted connected information E(F(m, Ra), Kp, r), generates decrypted connected information D(E(F(m,Ra), Kp, r)) by applying the decryption algorithm D to the received encrypted connected information E(F(m,Ra), Kp,r)(step S153), and outputs the decrypted connected information to the information removing unit 203 (step S154).

The information removing unit 203 receives the decrypted connected information D(E(F(m,Ra),Kp,r)), removes the additional information Ra from the received decrypted connected information so as to generate decrypted text m' (step S155), outputs the generated decrypted text m' to the one-way operation unit 204, and writes the generated decrypted text m' on the decrypted text storage 206 (step S156).

The one-way operation unit 204 receives the decrypted text m', hashes the received decrypted text m' according to the hash function h so as to calculate a value h(m'), and outputs the calculated value h(m') to the comparing unit 205 (step S157).

The comparing unit 205 receives the value h(m) and the value h(m'), compares the two values to judge whether the two values match, generates a comparison result j either showing that the values match or do not match, and writes the generated comparison result j on the comparison result storage 207 (step S158).

1.6 The Comparison of Action Between the Embodiment and the Conventional Examples The following is a description of decryption error detection according to the embodiment of the present invention. The decryption error detection of the present invention is then compared with those used in the conventional technologies.

When there is not a decryption error, the comparison result j which is to be outputted from the comparison unit 205 of the reception apparatus 20 is always 1.

The possibility that the comparison result j is 1, that is, the possibility that h(m') generated from the one-way operation unit 204 of the reception apparatus 20 happens to be equal to (i.e. match) h(m) generated from the one-way operation unit 104 of the transmission apparatus 10 is as follows:

For the one-way operation unit 104 and the one-way operation unit 204 using the hash function outputting a hash value of the length of k bits, there are $2^k$ ways of hash value with k bits. Therefore, the possibility thereof is $2^{-k}$.

Therefore, if there is actually a decryption error, the possibility that the decryption error is detected by examining the comparison result j generated by the reception apparatus 20 is $1-2^{-k}$.

For example, when it is assumed that a hash function is SHA-1, the SHA-1 has at least 160 bits of output. Therefore, the possibility will be $1-2^{-160}$, which means that almost all the detection errors can be detected.

Moreover, the communications through the internet 30 is a sum of the bit length of the ciphertext outputted from the encrypting unit 105 and the bit length of the hash value h' (m) outputted from the one-way operation unit 104. Generally speaking, the output bit length for a hash function is smaller than that for inputted data. Therefore, it is unlikely that the communications in this example is more than twice as many as the output bit length for the ciphertext.

For example, when the hash function to be used is SHA-1, this holds true since most cryptosystems including the NTRU cryptosystem use a ciphertext length of 160 bits or more.

The communications in the data cryptosystem according to the first conventional has several times as many as the output bits length of the ciphertext. Thus, it can be concluded that the communications is reduced for the present embodiment, therefore enhancing the communication efficiency.

Further, as for security considerations, the present embodiment makes it difficult to infer the inputted value from the outputted value. Moreover, the present embodiment is not designed, unlike the first conventional example, to transmit the same plaintext more than one time. Therefore, an adequate security level is insured in the present embodiment. In addition, in a case in which the protocol is adopted for re-transmitting the same data again by a re-transmission request, after the decryption error detection is performed, the present embodiment is more resistant to the multiple transmission attack than the data cryptosystem described in the first conventional example, since the present embodiment adds a random number to plaintext before encrypting.

Moreover, the conventional technology encrypts plaintext from its intact condition. This increases the possibility of being decrypted by a third party who intercepts the communication channel, when the sender resends, upon request from the receiver, ciphertext that is generated from the same plaintext. That is, there is a possibility that a third party can intercept and decrypt the several pieces of ciphertext into the plaintext. (This phenomenon is called multiple transmission attack as is mentioned in the first conventional example.)

On the contrary, the present embodiment is able to set different additional information Ra for each communication. This enables to create a different m||Ra value for same plaintext each time the sender has to resend ciphertext. This reduces the possibility of being illegally decrypted by a third party attempting to perform a multiple transmission attack.

Moreover, the low transmission quality of the transmission channel enables a difference to be detected between the original plaintext and the decrypted text, when the bit is lost or garbled, just as mentioned in the above.

2. Modifications of the Cryptocommunication System 1

The following is a description of modifications for the cryptocommunication system 1.

2.1 Modifications on the Additional Information

In the cryptocommunication system 1, the additional information generation unit 102 is to generate additional information Ra which is a random number. However, it is also possible to replace the additional information Ra with time stamp information or counter information. To summarize, the additional information that is generated by the additional information generation unit 102 can be any type of information as long as such information yields a different value every time it is used.

The time stamp information represents a current time when the additional information generation unit 102 generates a piece of additional information, and is specifically composed of information showing year, month, day, hour, minute, second, and millisecond, in a fixed length.

The counter information is numerical information in fixed digits, and is designed to add 1 every time it is used.

2.2 Modifications for Calculating the Connected Information F(m, Ra)

In the cryptocommunication system 1, the information adding unit 103 calculates connected information F(m, Ra)=m∥Ra, by uniting the plaintext m with the additional information Ra. However, the calculation method can be other than this method if it is invertible in such a way that m can be converted in the reverse direction based on the additional information.

Examples of the other calculation methods are explained below including the calculation method of the embodiment.

In order to extract only the plaintext by removing the additional information from the connected information, an inverse operation is performed.

(1) Calculation Method 1

The calculation method 1 is expressed as connected information F(m,Ra)=m∥Ra, where "∥" signifies a bit-connecting. This is a calculation for obtaining plaintext for the embodiment.

Note that an expression "connected information F(m,Ra)=Ra∥m" can be alternatively used for the expression described above.

Further, the plaintext m is divided into several pieces of partial plaintext information, each having length of 4 bits. In the same way, the additional information is also divided into several pieces of partial additional information, each having length of 4 bits. Then, connected information may be obtained by uniting the pieces of partial plaintext information and the pieces of partial additional information alternately. Generally speaking, a length of plaintext m is greater than a length of additional information. Therefore, the connected information usually ends with partial plaintext information.

(2) Calculation Method 2

The calculation method 2 is expressed as "connected information F(m,Ra)=m(+)Ra," where "(+)" signifies an exclusive OR, with its inverse operation being expressed as "decrypted text m'=connected information F(+) Ra."

(3) Calculation Method 3

The calculation method 3 is expressed as "connected information F(m,Ra)=m+Ra," with its inverse operation being expressed as "decrypted text m'=connected information F-Ra."

(4) Calculation Method 4

The calculation method 4 is expressed as "connected information F(m,Ra)=m×Ra mod p" where p is a prime number greater than m.

The inverse operation is performed as follows:

Decrypted text m'=connected information F/Ra mod p (5) Calculation Method 5

The calculation method 5 is expressed as "connected information F(m,Ra)=BitPerm [Ra] (m)," where BitPerm [Ra] (m) is an operation for replacing the bit expression m based on Ra.

The specific operation methods are shown in the following:

(5-1)Calculation Method 5-1

This expression is to bit-rotate m by Ra bits.

For example, if m is assumed to be "1111000011110000", and Ra is assumed to be Ra=3(in decimal notation), then the m after replacement can be expressed as m= 1000011110000111.

Here, the reverse bit rotation is also possible.

The inverse operation is performed by rotating the connected information F in a reverse direction by Ra bits.

(5-2)Calculation Method 5-2

In this method, m is replaced according to the calculation algorithm. In other words, an operation is performed first by making Ra an inputted value, and then m is replaced based on the calculation result.

The above-described two calculation method is described by using the following examples.

EXAMPLE

Ra is assumed to be 128-bit-length. The hash value of 16-bit-length is calculated from Ra by using a hash function. Next, m is bit-rotated by the obtained hash value as shown in the calculation method 5-1.

The inverse operation is performed as follows:

The connected information F is replaced according to the calculation algorithm. In other words, the operation is performed by making the Ra an inputted value. Then, the connected information F is replaced based on the operation result, in order to obtain decrypted text m'.

EXAMPLE

Ra is assumed to be 128-bit-length. A 16-bit-length hash value is calculated from Ra by using a hash function. Next, as the calculation method 5-1, the connected information F is bit-rotated in a reverse direction by the obtained hash value.

(5-3) Calculation Method 5-3

In the calculation method 5-3, several pieces of partial information are generated by dividing m into 4 bit length. Next, each piece of partial information is replaced by using the replacement table for 4 input-output bit length corresponding to Ra.

Here, the replacement table includes 16 sets beforeconversion bit row with 4 bit length, and the corresponding after conversion bit row with 4 bit length.

In the replacement table for Ra of a certain value (e.g. "1"), 16 before-conversion bit rows are expressed as 0000, 0001, 0010, . . . , 1110, and 1111. The corresponding 16 after-conversion bit rows are 1111, 1110, 1101, . . . , 0001 and 0000.

For a different value of Ra (e.g. 2), the replacement table corresponding thereto has 16 after-conversion bit rows: 1111, 1110, 1101, . . . , 0000, and 0001.

In the above fashion, more than one type of replacement table is made possible for each value of Ra.

The inverse operation is performed as follows.

Connected information F is divided into 4 bits, in order to generate several pieces of partial connected information. Next, the replacement in a reverse direction is performed for each piece of partial connected information by using the replacement table for 4 input-output bit length corresponding to a Ra.

(6) Calculation Method 6

The calculation method 6 is expressed as "connected information F(m,Ra)=Tab[Ra](m)," where Tab[Ra](m) means to convert m according to the conversion table Tab.

For example, when m is assumed to have 8-bit-length, each m is converted according to the table Tab as shown in FIG. 7 which is stored for each Ra. The conversion table Tab includes 256 sets of 8-bit value and 8-bit value.

For an example in which m=1, plaintext m is converted into 39 according to the conversion table Tab shown in FIG. 7.

The inverse operation is performed as follows:

Connected information F is converted in the reverse direction to the above, according to the conversion table Tab.

2.3 Modification Examples of the Cryptocommunication System 1 in Which Additional Information is Shared The following is a description on modification examples for the cryptocommunication system 1 in which additional information is shared.

(1) A first Modification Example

As a first modification example, a cryptocommunication system 1b is described which is a modified form of the cryptocommunication system 1.

(A Structure of the Cryptocommunication System 1b)

Figure 8:
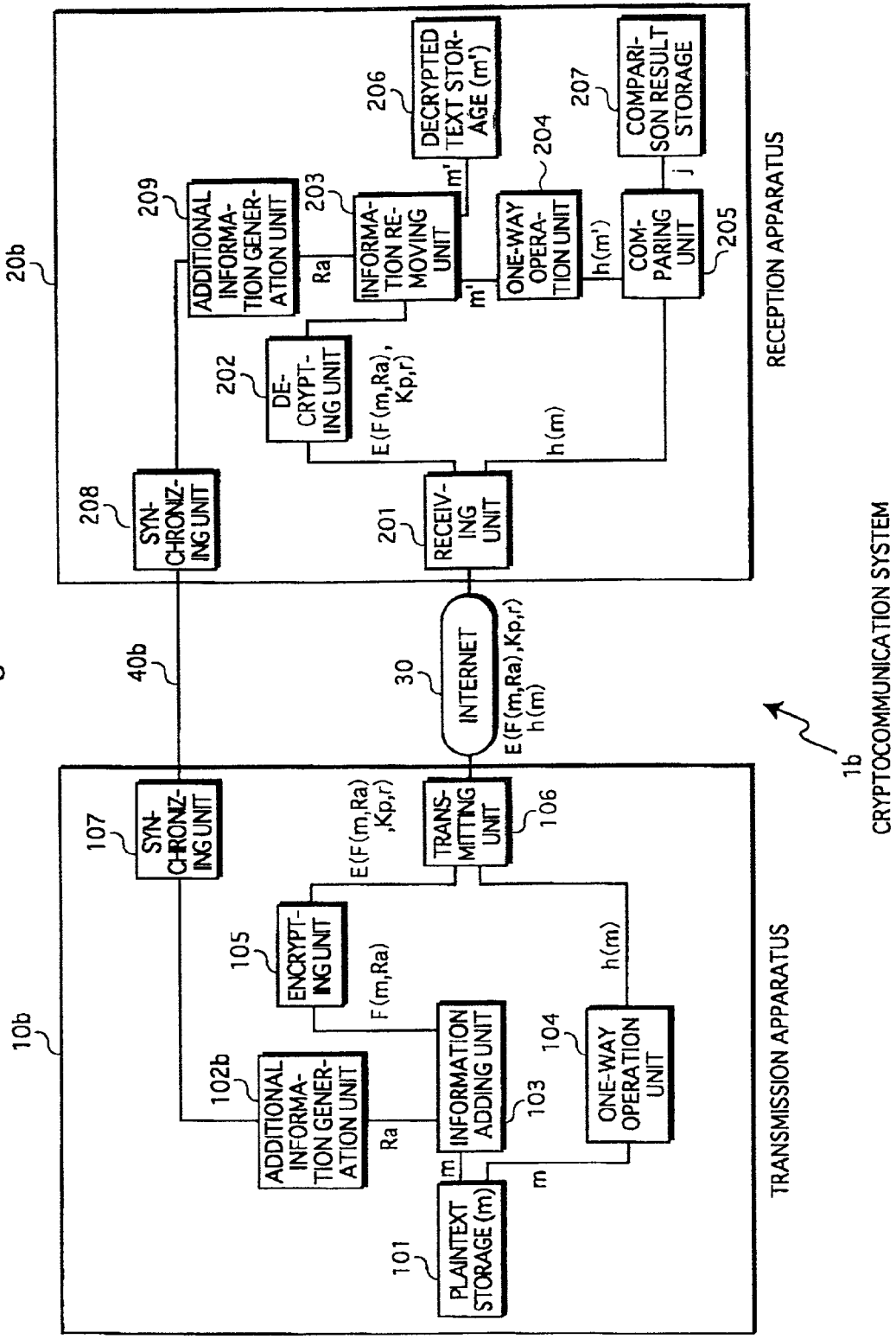
FIG. 8 is a block diagram showing a structure of a cryptocommunication system 1*b* which is a first modification example of the cryptocommunication system 1.

The cryptocommunication system 1b consists of a transmission apparatus 10b and a reception apparatus 20b, as shown in FIG. 8.

The transmission apparatus 10 band the reception apparatus 20b each have the same structure as the transmission apparatus 10 and the reception apparatus 20, respectively, that constitute the cryptocommunication system 1. The following is a description of the transmission apparatus 10b and the reception apparatus 20b, with an emphasis on the difference between the transmission apparatus 10 and the reception apparatus 20.

The transmission apparatus 10b is further equipped with a synchronizing unit 107. In addition, the transmission apparatus 10b is equipped with an additional information generation unit 102b instead of the additional information generation unit 102 which the cryptocommunication system 1 has. In addition, the reception apparatus 20b is further equipped with a synchronizing unit 208 and an additional information generation unit 209. The synchronizing unit 107 and the synchronizing unit 208 are connected to each other through the dedicated line 40b.

The synchronizing unit 107 generates a random number XR, and outputs the generated random number XR through the dedicated line 40b to the synchronizing unit 208. The synchronizing unit 107 further outputs the generated random number XR to the additional information generation unit 102b.

The additional information generation unit 102b, upon receiving the random number XR from the synchronizing unit 107, generates additional information Ra by using the received random number XR, and outputs the generated additional information Ra to the information adding unit 103. Here, an assumption is made that the random number XR is used as the additional information Ra without being processed, which is one example of generating additional information Ra from the random number XR.

The synchronizing unit 208 receives the additional information XR through the dedicated line 40b, and outputs the received additional information XR to the additional information generation unit 209.

The additional information generation unit 209, upon receiving the random number XR from the synchronizing unit 208, generates additional information Ra by using the received random number XR, and outputs the generated additional information Ra to the information removing unit 203. Here, an assumption is made that the random number XR is used as the additional information Ra without being processed, which is one example of generating additional information Ra from the random number XR.

(Action of the Cryptocommunication System 1b)

Figure 9:
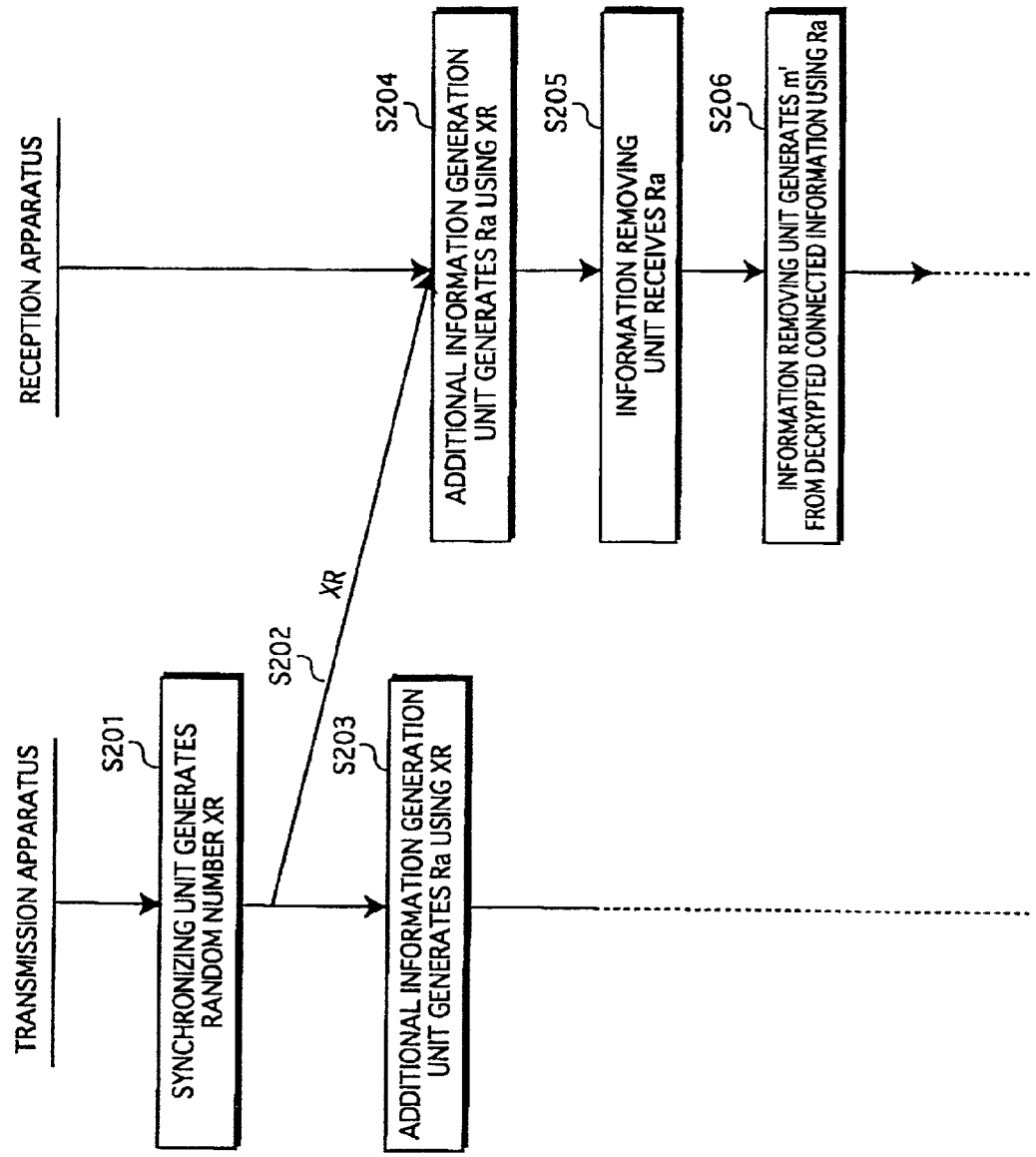
FIG. 9 is a flowchart showing an action performed by the cryptocommunication system 1*b*.

The action that the cryptocommunication system 1b performs is described in the following with reference to the flowchart shown in FIG. 9.

Note that the focus here is on the differences between the cryptocommunication systems 1b and 1, since most of the action is the same between the two systems.

The synchronizing unit 107 generates a random number XR (Step S201), and outputs the generated random number XR through the dedicated line 40b to the synchronizing unit 208 (Step S202). The synchronizing unit 107 further outputs the generated random number XR to the additional information generation unit 102b (step S203).

The additional information generation unit 102b, upon receiving the random number XR from the synchronizing unit 107, generates additional information Ra by using the received random number XR, and outputs the generated additional information Ra to the information adding unit 103 (step S203).

The synchronizing unit 208 receives the random number through the dedicated line 40b, and outputs the received random number XR to the additional information generation unit 209 (step S202).

The additional information generation unit 209, upon receiving the random number XR, generates additional information Ra by using the received random number XR (step S204), and outputs the generated additional information Ra to the information removing unit 203 (step S205). The information removing unit 203 receives the additional information Ra (step S205), and generates decrypted text m' from decrypted connected information by using the received additional information Ra (step S206).

(2) A Second Modification Example

A cryptocommunication system 1c is described which is a second modification example of the cryptocommunication system 1.

(A Structure of the Cryptocommunication System 1c)

Figure 10:
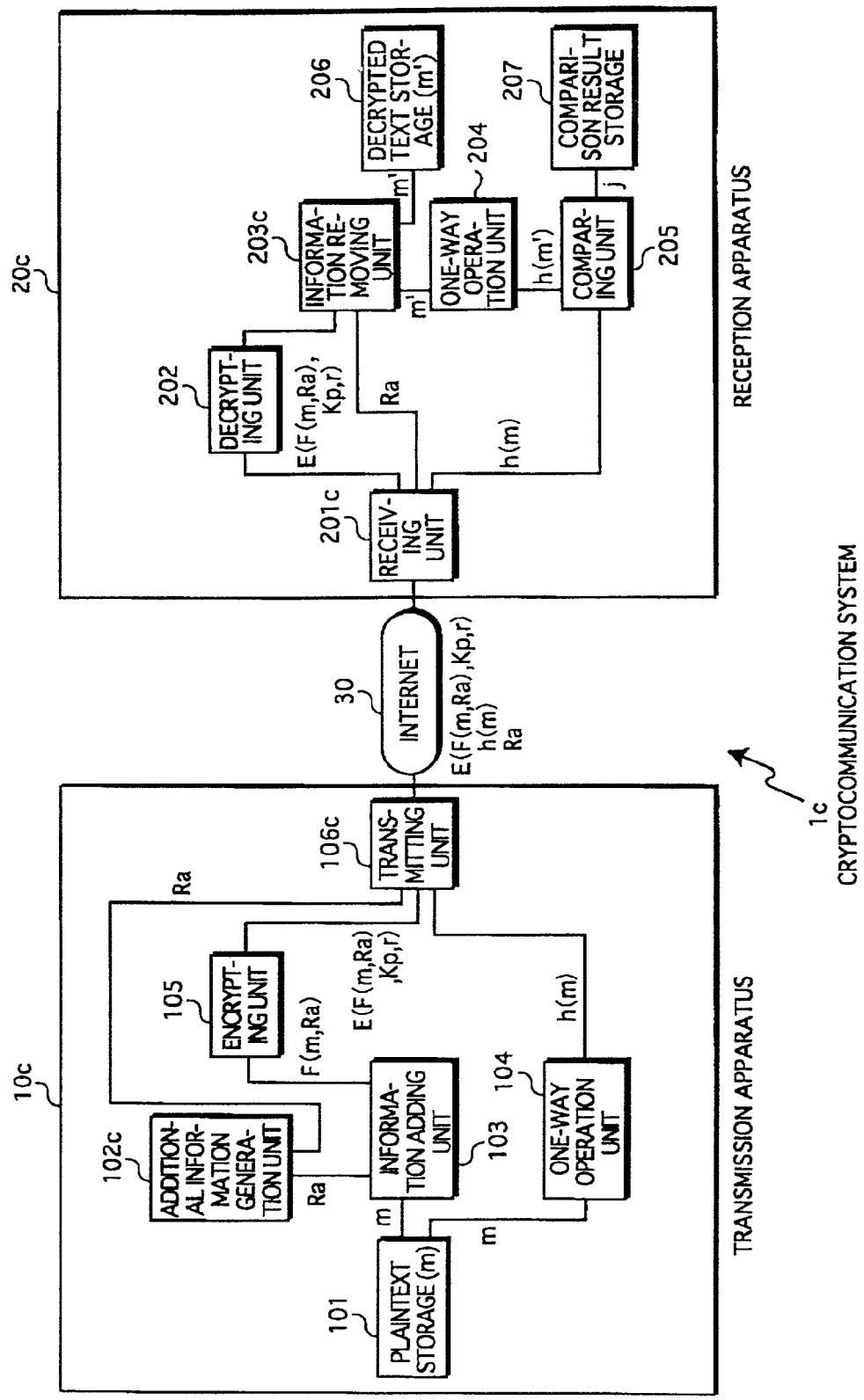
FIG. 10 is a block diagram showing a structure of a cryptocommunication system 1*c* which is a second modification example of the cryptocommunication system 1.

The cryptocommunication system 1c consists of a transmission apparatus 10c and a reception apparatus 20c, as shown in FIG. 10.

The transmission apparatus 10c and the reception apparatus 20c each have the same structure as the transmission apparatus 10 and the reception apparatus 20 for the cryptocommunication system 1.

The transmission apparatus 10c, instead of the additional information generation unit 102 and the transmitting unit 106, is equipped with an additional information generation unit 102c and a transmitting unit 106c. The reception apparatus 20c, instead of the information removing unit 203 and the receiving unit 201, is equipped with an information removing unit 203c and a receiving unit 201c.

The additional information generation unit 102c, the transmitting unit 106c, the information removing unit 203c, and the receiving unit 201c each have the same structure as the additional information generation unit 102, the transmitting unit 106, the information removing unit 203, and the receiving unit 201, respectively. Therefore, the focus in the following description will be on the differences there between.

The additional information generation unit 102c outputs the generated additional information Ra to the transmitting unit 106c.

The transmitting unit 106c receives the additional information Ra from the additional information generation unit 102c, and transmits the received additional information Ra to the reception apparatus 20c through the internet 30.

The receiving unit 201c receives the additional information Ra through the internet 30 from the transmission apparatus 10c, and outputs the received additional information Ra to the information removing unit 203c.

The information removing unit 203c receives the additional information Ra from the receiving unit 201, and generates decrypted text m' from decrypted connected information by using the received additional information Ra.

(Action of the Cryptocommunication System 1c)

Figure 11:
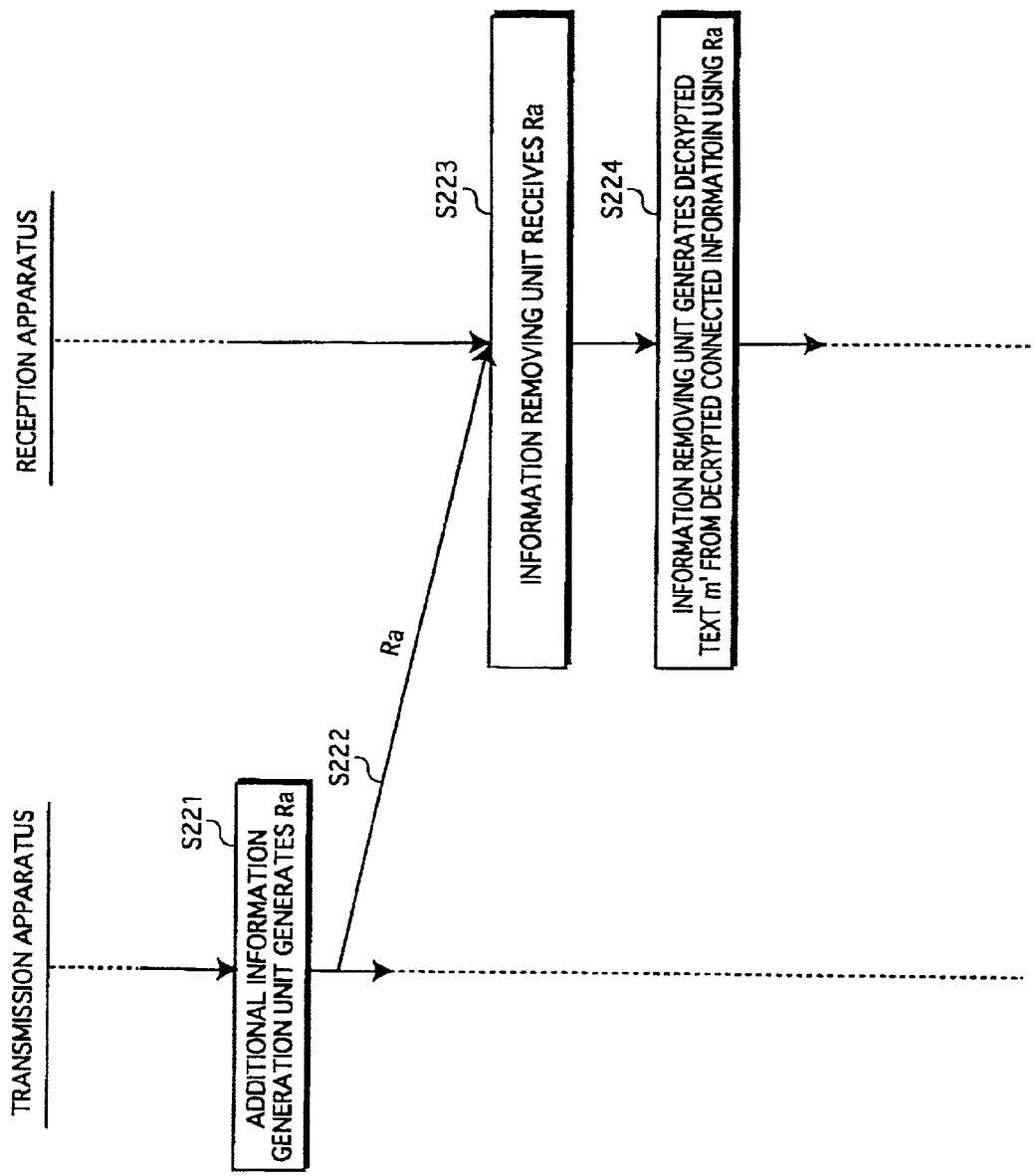
FIG. 11 is a flowchart showing an action performed by the cryptocommunication system 1*c*.

The action that the cryptocommunication system 1c performs is described in the following with reference to the flowchart shown in FIG. 11.

Note that the focus will be on the differences between the two systems, since the most of the action of the cryptocommunication system 1c is the same as the cryptocommunication system 1.

The additional information generation unit 102c generates additional information Ra, and outputs the generated additional information Ra to the transmitting unit 106c (step S221).

The transmitting unit 106c receives the additional information Ra from the additional information generation unit 102c, and transmits the received additional information Ra through the internet 30 to the reception apparatus 20c (step S222).

The receiving unit 201c receives the additional information Ra through the internet 30 from the transmission apparatus 10c, and outputs the received additional information Ra to the information removing unit 203c (step S222).

The information removing unit 203c receives the additional information Ra from the receiving unit 201c (step S223), and generates decrypted text m' from the decryption connected information by using the received additional information Ra (step S224).

(3) A Third Modification Example

The following is a description of a cryptocommunication system 1d which is a third modification example of the cryptocommunication system 1.

(A Structure of the Cryptocommunication System 1d)

Figure 12:
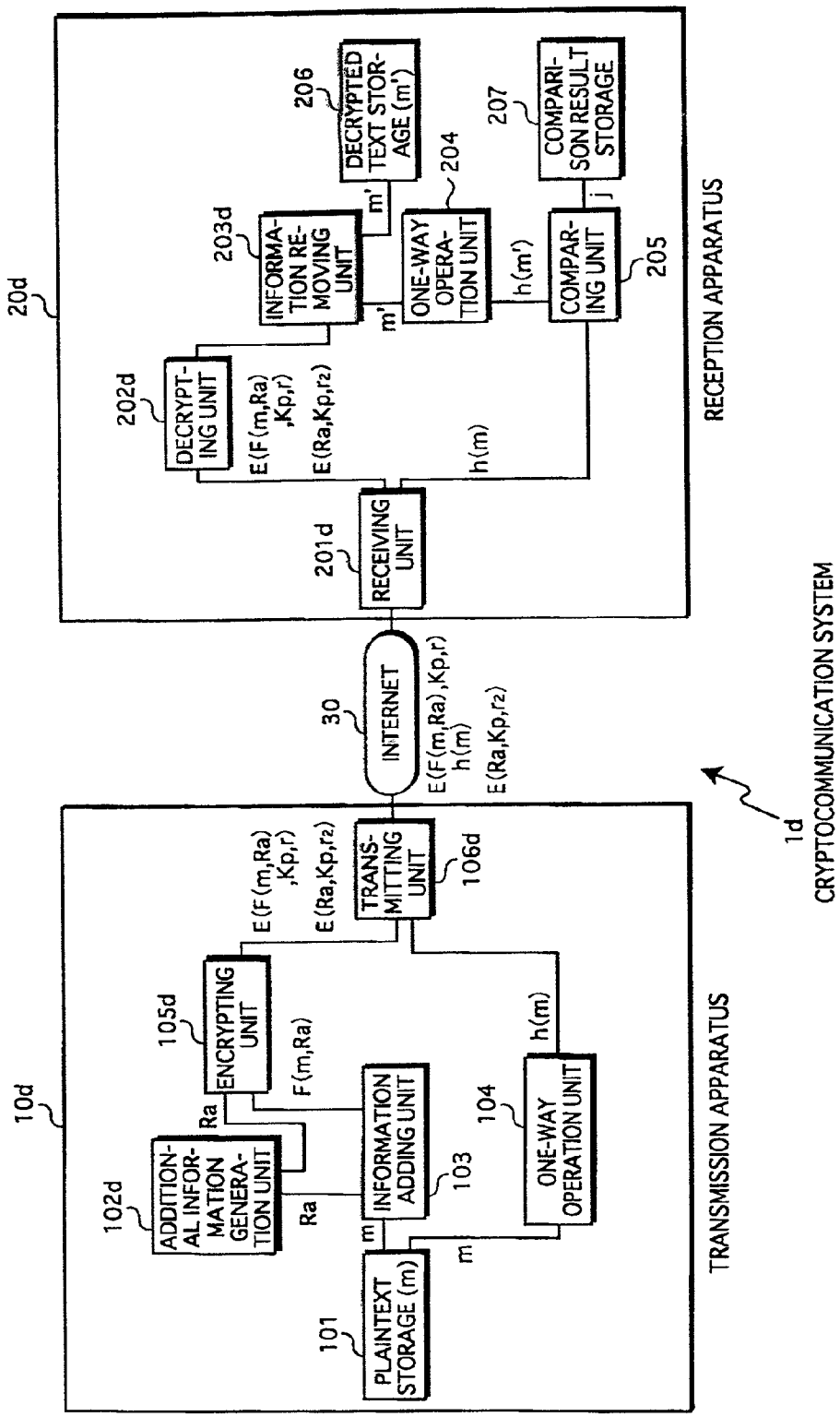
FIG. 12 is a block diagram showing a structure of a cryptocommunication system 1*d* which is a third modification example of the cryptocommunication system 1.

The cryptocommunication system 1d consists of a transmission apparatus 10d and a reception apparatus 20d, as shown in FIG. 12.

The transmission apparatus 10d and the reception apparatus 20d each have the same structure as the transmission apparatus 10 and the reception apparatus 20 that compose the cryptocommunication system 1.

The transmission apparatus 10d, instead of the additional information generation unit 102, the encrypting unit 105, and the transmitting unit 106, is equipped with an additional information generation unit 102d, an encrypting unit 105d, and a transmitting unit 106d. The reception apparatus 20d, instead of the decrypting unit 202, the information removing unit 203, and the receiving unit 201, is equipped with a decrypting unit 202d, an information removing unit 203d, and a receiving unit 201d.

The additional information generation unit 102d, the encrypting unit 105d, the transmitting unit 106d, the decrypting unit 202d, the information removing unit 203d, and the receiving unit 201d, each have the same structure as the additional information generation unit 102, the encrypting unit 105, the transmitting unit 106, the decrypting unit 202, the information removing unit 203, and the receiving unit 201, respectively. The following description focuses on the differences therebetween.

The additional information generation unit 102d generates additional information Ra, and outputs the generated additional information Ra to the encrypting unit 105d.

The encrypting unit 105d, upon receiving the additional information Ra from the additional information generation unit 102d, applies an encryption algorithm to the received additional information Ra, so as to generate encrypted additional information $E(Ra,Kp,r2)$. Here, r2 is a random number as r. Next, the encrypting unit 105d outputs the generated encrypted additional information $E(Ra, Kp, r2)$ to the transmitting unit 106d.

The transmitting unit 106d receives the encrypted additional information $E(Ra,Kp,r2)$ from the encrypting unit 105d, and transmits the received encrypted additional information $E(Ra,Kp,r2)$ through the internet 30 to the reception apparatus 20d.

The receiving unit 201d receives, through the internet 30, the encrypted additional information $E(Ra,Kp,r2)$ from the transmitting unit 106d, and outputs the received encrypted additional information $E(Ra,Kp,r2)$ to the decrypting unit 202d.

The decrypting unit 202d receives the encrypted additional information $E(Ra,Kp,r2)$ from the receiving unit 201d, and generates decrypted additional information $D(E(Ra,Kp,r2),Ks)$ by applying a decryption algorithm to the received encrypted additional information $E(Ra,Kp,r2)$. Next, the decrypting unit 202d outputs the generated decrypted additional information $D(E(Ra,Kp,r2),Ks)$ to the information removing unit 203d.

The information removing unit 203d receives the decrypted additional information $D(E(Ra,Kp,r2),Ks)$ from the decrypting unit 202d, and generates decrypted text m' from decrypted connected information $D(E(F(m,Ra),Kp,r),Ks)$ by using the received decrypted additional information $D(E(Ra,Kp,r2),Ks)$.

(Action of the Cryptocommunication System 1d)

Figure 13:
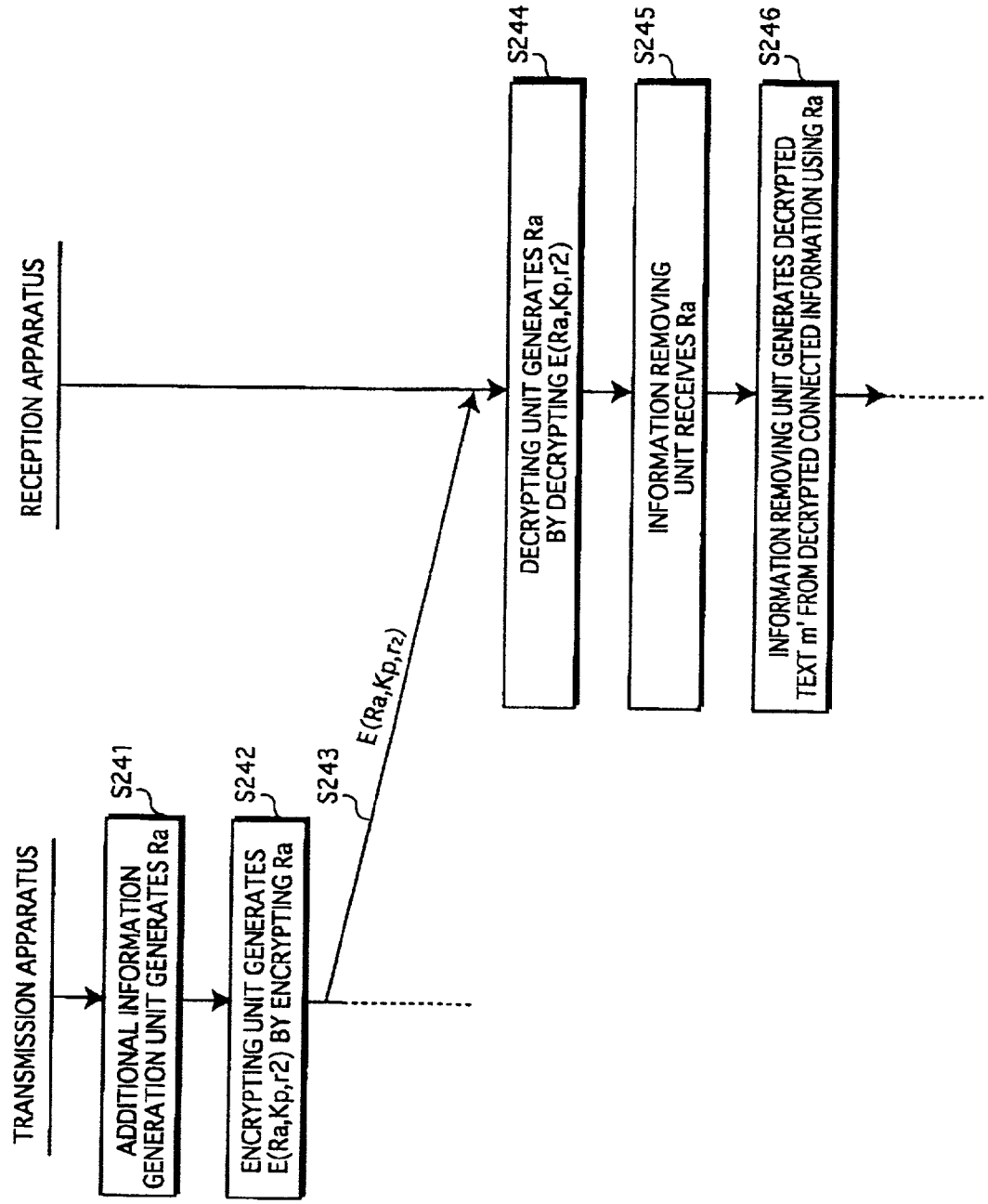
FIG. 13 is a flowchart showing an action performed by the cryptocommunication system 1*d*.

The action that the cryptocommunication system 1d performs is described in the following with reference to the flowchart shown in FIG. 13.

Since the action of the cryptocommunication system 1d is mostly the same as that of the cryptocommunication system 1, the focus in the following description is on their differences.

The additional information generation unit 102d generates additional information Ra, and outputs the generated additional information Ra to the encrypting unit 105d (step S241).

The encrypting unit 105d receives the additional information Ra from the additional information generation unit 102d, generates encrypted additional information $E(Ra,Kp,r2)$ by applying an encryption algorithm to the received additional information Ra, and outputs the generated encrypted additional information $E(Ra,Kp,r2)$ to the transmitting unit 106d (step S242).

The transmitting unit 106d receives the encrypted additional information $E(Ra,Kp,r2)$ from the encrypting unit 105d, and transmits the received encrypted additional information E(Ra,Kp,r2) through the internet 30 to the reception apparatus 20d (step S243).

The receiving unit 201d receives, from the transmitting unit 106d, the encrypted additional information E(Ra,Kp,r2) through the internet 30, and outputs the received encrypted additional information E(Ra,Kp,r2) to the decrypting unit 202d (step S243).

The decrypting unit 202d receives the encrypted additional information E(Ra,Kp,r2) from the receiving unit 201d, and generates decrypted additional information D(E(Ra,Kp,r2),Ks) by applying a decryption algorithm to the received encrypted additional information E(Ra,Kp,r2). Then, the decrypting unit 202d outputs the generated decrypted additional information D(E(Ra,Kp,r2),Ks) to the information removing unit 203d (step S244).

The information removing unit 203d receives, from the decrypting unit 202d, the decrypted additional information D(E(Ra,Kp,r2),Ks) (step S245), and generates decrypted text m' from the decrypted connected information D(E(F(m,Ra),Kp,r),Ks) by using the received encrypted additional information D(E(Ra,Kp,r2),Ks) (Step S246).

2.4 Feasible Combination Between Modifications

Feasible combinations between the modifications regarding the additional information, the modifications for the calculation of the connected information F(m,Ra), and the modification examples of the cryptocommunication system in which the additional information is shared are described in the following with reference to the table shown in FIG. 14.

As the table in FIG. 14 shows, each modification for additional information (i.e. a random number, a time stamp, and a counter) can be used with all the modifications for calculating connected information F(m,Ra), or with the modification examples of the cryptocommunication system in which the additional information is shared.

Further, as shown in FIG. 14, the modification in which m∥Ra is used for calculating the connected information is applicable to cryptocommunication systems 1, and 1b–1d.

In addition, among the modifications for calculating connected information F(m, Ra), m(+)Ra, m+Ra, m×Ra, mod p, BitPerm [Ra] (m), Tab[Ra] (m) methods, as shown in FIG. 14, are applicable to the cryptocommunication systems 1b–1d.

3. Other Modification Examples

So far, the present invention was described based on the embodiment. The present invention is not limited to the described embodiment, and also includes other cases described below.

(1) The cryptocommunication system 1 may be structured in the following way. The one-way function unit 104 of the transmission apparatus 10 receives connected information F(m, Ra) from the information adding unit 103, hashes the received connected information F(m,Ra) according to the hash function h to generate a functional value h(F(m, Ra)), and transmits the functional value h(F(m,Ra)), through the transmitting unit 106, the internet 30, and the receiving unit 201, to the comparing unit 205.

The one-way function unit 204 of the reception apparatus 20 receives decrypted connected information D(E(F(m,Ra),Kp,r),Ks) from the decrypting unit 202, hashes the received D(E(F(m, Ra),Kp,r),Ks) according to the hash function h so as to generate a functional value h(D(E(F(m,Ra),Kp,r),Ks)), and outputs the generated functional value h(D(E(F(m,Ra),Kp,r),Ks)) to the comparing unit 205. The comparing unit 205 compares the functional value h(F(m,Ra)) and the functional value h(D(E(F(m,Ra),Kp,r),Ks)) and judges whether the two values match.

In the above way, the judgement is performed as to whether or not the plaintext has been correctly decrypted.

(2) Moreover, the Cryptocommunication System 1 May be Structured in the Following Way.

The information adding unit 103 of the transmission apparatus 10, by using G which is a different invertible operation from F, generates connected information G(m,Ra). Here, an example of G is G=Ra∥m. Next, the information adding unit 103 outputs the generated connected information G(m,Ra) to the one-way function unit 104. The one-way function unit 104 receives the connected information G(m, Ra) from the information adding unit 103, hashes the received connected information G(m,Ra) according to the hash function h so as to generate a functional value h(G (m, Ra)), and transmits the generated functional value h(G(m, Ra)), through the transmitting unit 106, the internet 30, and the receiving unit 201, to the comparing unit 205.

Further, the information removing unit 205 of the reception apparatus 20, by using the decrypted text m', a random number Ra, and the connected information G, generates connected information G(m',Ra), and transmits the generated G(m',Ra) to the one-way function unit 204. Here, the information removing unit 203 shares the same random number Ra with the transmission apparatus 10, as shown in the first modification example. The one-way function unit 204 receives the connected information G(m',Ra), hashes the received connected information G(m',Ra) according to the hash function h so as to generate a functional value h (G (m',Ra)), and outputs the generated functional value h(G(m',Ra)) to the comparing unit 205. The comparing unit 205 compares the functional value h(G(m,Ra)) and the functional value h(G(m',Ra) to see whether the two values match.

In the above way, the judgment is performed as to whether or not the plaintext has been decrypted correctly.

(3) The encryption algorithm and the decryption algorithm are not limited to those described in the embodiment, and other crypto-algorithms are also possible. For example, ordinary cryptosystems such as the DES cryptosystem, the RSA cryptosystem, and the ElGamal cryptosystem can also be used.

In addition, for the one-way operation unit 104, cryptosystem functions used for the ordinary cryptosystems can be also used as well as the hash functions.

For a detailed description about the DES cryptosystem, the RSA cryptosystem, and the ElGamal cryptosystem, please refer to Tatsuaki Okamoto, Yamamoto Hirosi, "Gendai Ango" (Modern Cryptography), Series/Mathematics in Information Science, Sangyo Tosho, 1997.

Further, it can be also arranged so that each couple of transmitting users and receiving users can have a different one-way operation, instead of all the users in one system sharing one one-way operation.

(4) In the present embodiment, the transmission apparatus 10 and the reception apparatus 20 are connected to each other through the internet 30. However, the means to connect the transmission apparatus 10 and the reception apparatus 20 is not limited to the internet, and can also be a dedicated line, or by over-the-air (wireless) communication.

(5) The present invention can be the method described above, or can be a computer program enabling the method by a computer. Alternatively, the present invention can be implemented as digital signals comprised of the computer program.

Further, the present invention can be a recording medium which can be read from by using a computer, such as a flexible disk, a hard disk, CD-ROM, MO, a DVD, DVD-ROM, DVD-RAM, or semiconductor memory, which stores the computer program or the digital signals. Alternatively, the present invention can also be the computer program or the digital signals recorded on these recording media.

Further, the present invention can transmit the computer program or the digital signals through a network represented by electric communication lines, over-the-air, cable transmission lines, or the internet, for example.

Further, the present invention can be a computer system that is equipped with a microprocessor and memory, in which the memory stores a computer program, and the microprocessor can work according to the computer program.

In addition, another computer system which is independent from the described computer system can realize the tasks, by transmitting the computer program or the digital signals stored in the recording media, or by transmitting the computer program or the digital signals through the network and the like.

(6) The stated embodiment and the modifications thereof can be combined with each other.

Although the present invention has been fully described by way of examples with reference to the accompanying drawings, it is to be noted that various changes and modifications will be apparent to those skilled in the art. Therefore, unless such changes and modifications otherwise depart from the scope of the present invention, they should be construed as being included therein.

What is claimed is:

1. A cryptocommunication system including a transmission apparatus and a reception apparatus, wherein:
   said transmission apparatus is operable to encrypt plaintext to generate ciphertext, perform a one-way operation on the plaintext to generate a first value, and transmit the ciphertext and the first value to said reception apparatus;
   said reception apparatus is operable to receive the ciphertext and the first value, decrypt the ciphertext to generate decrypted text, perform the one-way operation on the decrypted text to generate a second value, and judge that the decrypted text matches the plaintext when the second value and the first value match;
   said transmission apparatus comprises
      first generating means for generating first additional information,
      first operation means for performing an invertible bit-connecting operation on the plaintext and the first additional information to generate connected information,
      encrypting means for encrypting the connected information according to an encryption algorithm so as to generate the ciphertext, and
      transmitting means for transmitting the ciphertext; and
   said reception apparatus comprises
      receiving means for receiving the ciphertext transmitted from said transmitting means,
      second generating means for generating second additional information which is identical to the first additional information generated by said first generating means,
      decrypting means for decrypting the ciphertext according to a decryption algorithm, which is an inverse-conversion of the encryption algorithm, so as to generate decrypted connected information, and
      second operation means for performing an inverse operation of the invertible bit-connecting operation on the decrypted connected information and the second additional information so as to generate the decrypted text.

2. The cryptocommunication system of claim 1, wherein said second generating means synchronizes with said first generation means so as to generate the second additional information which is identical to the first additional information.

3. The cryptocommunication system of claim 1, wherein:
   said first generating means transmits the first additional information; and
   said second generating means receives the first additional information and sets the received first additional information as the second additional information.

4. The cryptocommunication system of claim 1, wherein:
   said first generating means encrypts the first additional information according to the encryption algorithm so as to generate encrypted additional information, and transmits the generated encrypted additional information; and
   said second generating means receives the encrypted additional information, decrypts the received encrypted additional information according to the decryption algorithm, which is an inverse-conversion of the encryption algorithm, so as to generate additional information, and sets the generated additional information as the second additional information.

5. The cryptocommunication system of claim 1, wherein said first generating means generates a random number, and sets the generated random number as the first additional information.

6. The cryptocommunication system of claim 1, wherein:
   said first operation means bit-connects the plaintext with the first additional information to generate the connected information by uniting binary values representing the plaintext with binary values representing the first additional information; and
   said second operation means deletes the second additional information from the decrypted connected information so as to generate the decrypted text.

7. The cryptocommunication system of claim 1, wherein when said transmission apparatus encrypts the plaintext that has been encrypted and transmitted so as to newly generate the ciphertext and transmits the newly generated ciphertext to said reception apparatus, and said reception apparatus receives the newly generated ciphertext and decrypts the received ciphertext,
   said first generating means generates third additional information which is different from the first additional information,
   said first operation means performs an invertible operation on the plaintext and the third additional information so as to obtain newly generated connected information,
   said encrypting means encrypts the newly generated connected information according to an encryption algorithm so as to obtain the newly generated ciphertext,
   said transmitting means transmits the newly generated ciphertext,
   said receiving means receives the newly generated ciphertext, said second generating means generates fourth additional information which is identical to the third additional information, said decrypting means decrypts the newly generated ciphertext according to a decryption algorithm, which is an inverse-conversion of the encryption algorithm, so as to obtain newly generated decrypted connected information, and said second operation means performs an inverse operation of the invertible operation on the newly generated decrypted connected information and the fourth additional information so as to obtain newly generated decrypted text.

8. The cryptocommunication system of claim 1, wherein:

said transmission apparatus performs the one-way function on the connected information instead of on the plaintext so as to generate a first functional value;

said reception apparatus performs the one-way function on the decrypted connected information instead of on the decrypted text so as to generate a second functional value; and said reception apparatus judges whether the first and the second functional values match.

9. The cryptocommunication system of claim 1, wherein:

said transmission apparatus further performs, on the plaintext, a different invertible operation from the invertible operation so as to generate first connected information;

said transmission apparatus performs the one-way function on the first connected information, instead of on the plaintext, so as to generate a first functional value;

said reception apparatus further performs the different invertible operation on the decrypted text so as to generate second connected information;

said reception apparatus performs the one-way function on the second connected information, instead of on the decrypted text, so as to generate a second functional value; and said reception apparatus judges whether the first and the second functional values match.

10. A cryptocommunication method used by a cryptocommunication system including a transmission apparatus and a reception apparatus, wherein:

the transmission apparatus encrypts plaintext to generate ciphertext, performs a one-way operation on the plaintext to generate a first value, and transmits the ciphertext and the first value to the reception apparatus;

the reception apparatus receives the ciphertext and the first value, decrypts the ciphertext to generate decrypted text, performs the one-way operation on the decrypted text to generate a second value, and judges that the decrypted text matches the plaintext when the second value and the first value match;

said cryptocommunication method includes a transmission operation which is executed by the transmission apparatus and a reception operation which is executed by the reception apparatus;

said transmission operation comprises generating first additional information, performing an invertible bit-connecting operation on the plaintext and the first additional information to generate connected information, encrypting the connected information according to an encryption algorithm to generate the ciphertext, and transmitting the ciphertext; and said reception operation comprises receiving the ciphertext transmitted in said transmitting of the ciphertext, generating second additional information which is identical to the first additional information generated in said generating of the first additional information, decrypting the ciphertext according to a decryption algorithm, which is an inverse-conversion of the encryption algorithm, so as to generate decrypted connected information, and performing an inverse operation of the invertible bit-connecting operation on the decrypted connected information and the second additional information so as to generate the decrypted text.

11. A cryptocommunication program stored on a computer-readable medium and used by a cryptocommunication computer system including a transmission apparatus and a reception apparatus, wherein:

the transmission apparatus encrypts plaintext to generate ciphertext, performs a one-way operation on the plaintext to generate a first value, and transmits the ciphertext and the first value to the reception apparatus;

the reception apparatus receives the ciphertext and the first value, decrypts the ciphertext to generate decrypted text, performs the one-way operation on the decrypted text to generate a second value, and judges that the decrypted text matches the plaintext when the second value and the first value match;

said cryptocommunication program includes a transmission operation which is executed by the transmission apparatus and a reception operation which is executed by the reception apparatus;

said transmission operation comprises generating first additional information, performing an invertible bit-connecting operation on the plaintext and the first additional information to generate connected information, encrypting the connected information according to an encryption algorithm to generate the ciphertext, and transmitting the ciphertext; and said reception operation comprises receiving the ciphertext transmitted in said transmitting of the ciphertext;

generating second additional information which is identical to the first additional information generated in said generating of the first additional information, decrypting the ciphertext according to a decryption algorithm, which is an inverse-conversion of the encryption algorithm, so as to generate decrypted connected information, and performing an inverse operation of the invertible bit-connecting operation on the decrypted connected information and the second additional information so as to generate the decrypted text.

12. A recording medium which can be read from by using a computer and which stores a cryptocommunication program used by a cryptocommunication system including a transmission apparatus and a reception apparatus, wherein:

the transmission apparatus encrypts plaintext to generate ciphertext, performs a one-way operation on the plaintext to generate a first value, and transmits the ciphertext and the first value to the reception apparatus;

the reception apparatus receives the ciphertext and the first value, decrypts the ciphertext to generate decrypted text, performs the one-way operation on the decrypted text to generate a second value, and judges that the decrypted text matches the plaintext when the second value and the first value match;

said cryptocommunication program includes a transmission operation which is executed by the transmission apparatus and a reception operation which is executed by the reception apparatus;

said transmission operation comprises
  generating first additional information,
  performing an invertible bit-connecting operation on the plaintext and the first additional information to generate connected information,
  encrypting the connected information according to an encryption algorithm to generate the ciphertext, and
  transmitting the ciphertext; and said reception operation comprises
  receiving the ciphertext transmitted in said transmitting of the ciphertext,
  generating second additional information which is identical to the first additional information generated in said generating of the first additional information,
  decrypting the ciphertext according to a decryption algorithm, which is an inverse-conversion of the encryption algorithm, so as to generate decrypted connected information, and
  performing an inverse operation of the invertible bit-connecting operation on the decrypted connected information and the second additional information so as to generate the decrypted text.

13. A transmission apparatus operable to encrypt plaintext to generate ciphertext, perform a one-way operation on the plaintext to generate a first value, and transmit the ciphertext and the first value, said transmission apparatus comprising:
  first generating means for generating first additional information;
  first operation means for performing an invertible bit-connecting operation on the plaintext and the first additional information to generate connected information;
  encrypting means for encrypting the connected information according to the encryption algorithm so as to generate ciphertext; and
  transmitting means for transmitting the ciphertext.

14. A reception apparatus operable to receive, from a transmission apparatus, ciphertext and a first value, wherein:
  the transmission apparatus encrypts plaintext to generate the ciphertext, performs a one-way operation on the plaintext to generate the first value, and transmits the ciphertext and the first value to said reception apparatus;
  said reception apparatus is operable to the ciphertext to generate decrypted text, perform the one-way operation on the decrypted text to generate a second value, and judge that the decrypted text corresponds to the plaintext only when the second value and the first value match; and
  said reception apparatus comprises
    receiving means for receiving the ciphertext from said transmission apparatus of claim 13;
    second generating means for generating second additional information which is identical to the first additional information;
    decrypting means for decrypting the ciphertext according to a decryption algorithm, which is an inverse-conversion of the encryption algorithm, to generate decrypted connected information; and
    second operation means for performing an inverse operation of the invertible bit-connecting operation on the decrypted connected information and the second additional information so as to generate the decrypted text.

* * * * *